United States Patent
Gold (10) Patent No.: US 11,033,172 B2
(45) Date of Patent: Jun. 15, 2021

(54) SHOE SOLE CLEANING DEVICE

(71) Applicant: Steven A. Gold, Tiburon, CA (US)

(72) Inventor: Steven A. Gold, Tiburon, CA (US)

( * ) Notice: Subject to any disclaimer, the term of this patent is extended or adjusted under 35 U.S.C. 154(b) by 233 days.

(21) Appl. No.: 16/191,014

(22) Filed: Nov. 14, 2018

(65) Prior Publication Data

US 2019/0076000 A1 Mar. 14, 2019

Related U.S. Application Data

(63) Continuation-in-part of application No. 15/374,416, filed on Dec. 9, 2016, now Pat. No. 10,426,316.

(60) Provisional application No. 62/386,737, filed on Dec. 11, 2015.

(51) Int. Cl.
| | |
|---|---|
| *A47L 23/02* | (2006.01) |
| *A47L 23/22* | (2006.01) |
| *A46B 13/04* | (2006.01) |
| *B01D 35/02* | (2006.01) |
| *B08B 1/04* | (2006.01) |
| *B01D 29/01* | (2006.01) |
| *B08B 1/00* | (2006.01) |

(52) U.S. Cl.
CPC .............. *A47L 23/02* (2013.01); *A46B 13/04* (2013.01); *A47L 23/22* (2013.01); *B01D 29/01* (2013.01); *B01D 35/02* (2013.01); *B08B 1/002* (2013.01); *B08B 1/04* (2013.01)

(58) Field of Classification Search
CPC .......... A47L 23/02; A47L 23/22; A47L 23/00; A47L 23/26; A47L 23/263; A46B 2200/306; A46B 13/04; A47K 7/026
See application file for complete search history.

(56) References Cited

U.S. PATENT DOCUMENTS

| | | |
|---|---|---|
| 2,953,805 A | 9/1960 | Sevenich |
| 3,048,867 A | 8/1962 | Counts |
| 3,054,129 A | 9/1962 | Dragoon |
| 3,081,471 A * | 3/1963 | Newell ................... A47K 7/04 15/88.3 |
| 3,308,499 A | 3/1967 | Stieger |
| 3,383,726 A | 5/1968 | Chapin |
| 3,482,272 A | 12/1969 | McLennon |
| 3,696,459 A | 10/1972 | Kucera et al. |
| 4,014,060 A | 3/1977 | Taylor |
| 4,866,805 A | 9/1989 | Oden et al. |
| 5,556,685 A | 9/1996 | Swicegood, Jr. |
| 5,964,959 A * | 10/1999 | Bleth ..................... A47L 23/02 134/104.2 |
| 5,996,160 A | 12/1999 | Pruitt |
| 6,105,201 A | 8/2000 | Min |
| 6,141,811 A * | 11/2000 | Nakamura ............. A46B 13/04 15/21.1 |
| 6,886,209 B2 | 5/2005 | Blum et al. |
| 7,051,393 B2 | 5/2006 | Cox |
| 7,832,044 B2 | 11/2010 | Kessler et al. |

(Continued)

*Primary Examiner* — Laura C Guidotti
(74) *Attorney, Agent, or Firm* — Renner, Otto, Boisselle & Sklar, LLP (57) ABSTRACT

A shoe sole cleaning device may include a fluid reservoir having an inner chamber, a trough fluidly coupled to the fluid reservoir, a brush having bristles and operably connected to an axial shaft, the brush disposed partially within or above the trough, and a motor operably connected to the axial shaft and configured to cause the brush to rotate about the axial shaft.

18 Claims, 7 Drawing Sheets

(56) References Cited

U.S. PATENT DOCUMENTS

| | | | |
|---|---|---|---|
| 8,931,134 B2 | 1/2015 | Jefferson et al. | |
| 9,609,984 B1 * | 4/2017 | Kelly | A47K 7/04 |
| 2007/0271715 A1 | 11/2007 | Scoralle | |
| 2010/0115717 A1 * | 5/2010 | Vogt | A47L 23/263 15/4 |
| 2014/0223684 A1 | 8/2014 | Hawkins | |

* cited by examiner

SHOE SOLE CLEANING DEVICE

FIELD OF THE INVENTION

The present invention relates generally to the field of shoe sole cleaning devices.

DESCRIPTION OF THE RELATED ART

Entry way floor mats are commonly used to help people clean the soles of their shoes before entering a home or office.

Most floor mats employ a fibrous material that reaches into the crevices of a shoe sole. The person wearing the shoes rubs the soles across the mat to remove excess dirt. These mats, however, do not effectively remove accumulated grease, microbial dirt particles, etc.

Over the years, the field of shoe sole cleaning devices has evolved to address the problem of more completely and effectively cleaning the bottom of a person's shoe before entering a home or office. Prior art shoe sole cleaning devices, however, continue to have significant problems.

An entry mat that, for example, includes a brush that reciprocates or rotates would be a more effective way of cleaning the soles of a person's shoes. Attempting to remove germs, grease, and dirt from shoe soles by using a dry brush, however, is not very effective.

The entry mat may be further improved by applying a liquid to the mat or the soles themselves to assist with cleaning. A problem with this approach, however, is that once the soles have been cleaned, the soles remain wet. Entering a home or office with wet shoes may be preferable to dirty shoes but still unacceptable. A second, dry, mat may be provided for drying the shoes, but this approach requires additional floor space and an additional step in the cleaning process. An air dryer may be provided instead, but this approach adds complexity and cost to the device.

Another problem with applying liquid to the soles is that it is inconvenient for a person to manually apply the liquid. Some kind of automated liquid application may be devised. This approach, however, still requires an additional, drying mat or an air dryer. And, moreover, it requires frequent refilling of the reservoir containing the liquid, which is inconvenient and could be expensive.

BRIEF SUMMARY OF THE INVENTION

The invention disclosed herein provides a shoe sole cleaning device including a brush that rotates partially inside a trough. The trough may be filled with a cleaning solution including, for example, an antiseptic or other solution to assist with cleaning of the sole. As discussed above, however, including a cleaning solution as part of the shoe sole cleaning requires too frequent refilling of the reservoir containing the liquid and results in wet soles that require an additional drying mat or an air dryer.

The invention disclosed herein addresses the first problem, too frequent refilling, by providing for recycling of the cleaning solution, which would increase the time period between required refilling of the cleaning solution reservoir.

The invention disclosed herein addresses the second problem, wet soles, by allowing for a cleaning solution that may include a drying agent (e.g., surfactant, alcohol, citric acid, etc.) to assist in rapid drying of the soles after cleaning. Adding the drying agent could obviate the need to have a drying mat or air dryer.

Including the drying agent in the cleaning solution by itself would further exacerbate the refilling problem because the cleaning solution including the drying agent will tend to evaporate significantly more rapidly than cleaning solution without a drying agent. This would also be true of cleaning solutions including solvents and/or disinfectants and other compounds that evaporate relatively easily even without a discrete drying agent added. Therefore, the present invention provides a system that is very carefully designed to, not just recycle the cleaning solution, but also to significantly reduce leaking and evaporation of the cleaning solution. This results in significantly increased time periods between refilling of the cleaning solution reservoir.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
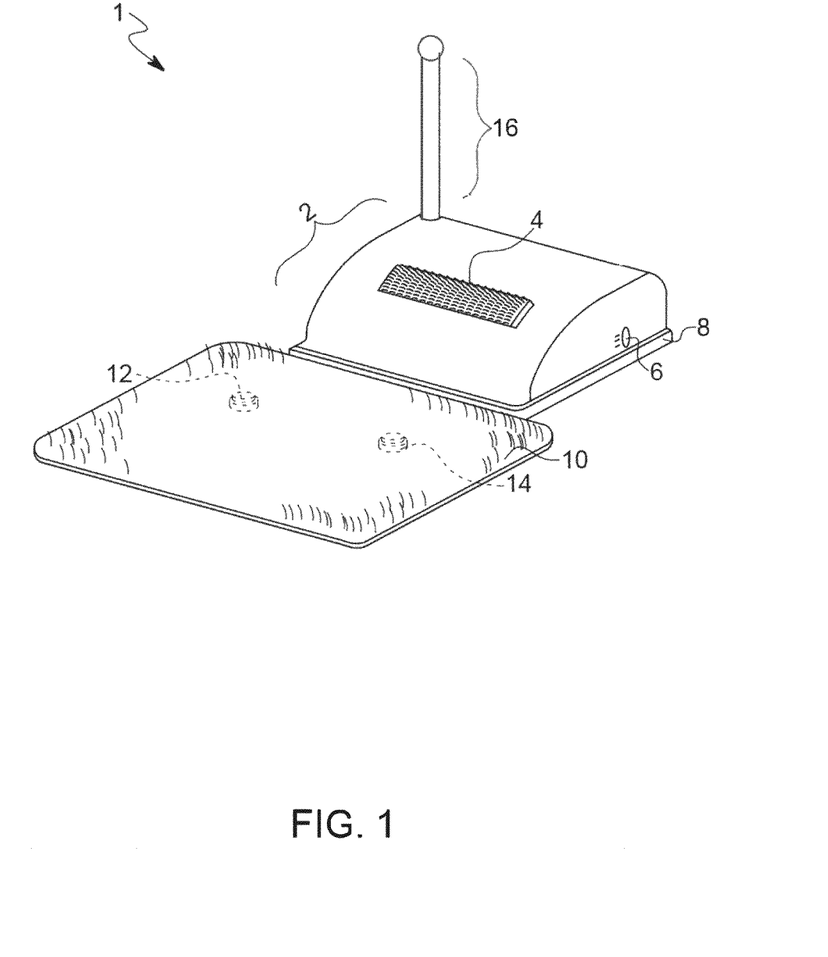
FIG. 1 illustrates a perspective view of an exemplary shoe sole cleaning device.

FIG. 1 illustrates an exemplary shoe sole cleaning device 1. In the illustrated embodiment, a housing cover 2 and a base plate 8 of the device 1 enclose a mechanism that causes a cylindrically shaped cleaning brush 4 to rotate when a user presses on one of the switches 12, 14 (shown in dotted line in FIG. 1), which may be momentary foot-operated switches. In one embodiment, the device 1 includes an on/off switch (not shown) instead of or in addition to the switches 12, 14 to activate the device.

The device 1 may include an absorbent mat 10. The switches 12, 14 may be located within or under the mat 10. The absorbent mat 10 may be made of, for example, highly moisture-absorbent polyester material to quickly and efficiently remove excess moisture from the user's shoe soles. The absorbent mat 10 alternatively may be made of highly moisture absorbent materials other than polyester. In some embodiments, the device 1 may not include the absorbent mat 10 or the switches 12, 14.

The shoe sole cleaning device 1 may also include a support post 16 that a user may hold on to with one hand while using the device 1 to clean the sole of a first shoe. The support post 16 may be from two to five feet long and vertically oriented as shown. A user may hold on to the post 16, press one of the switches 12, 14 with one shoe and bring the sole of the other shoe into contact with the brush 4 to be cleaned. Once the first shoe's sole is clean, the user may repeat the procedure with the other shoe sole.

Figure 2:
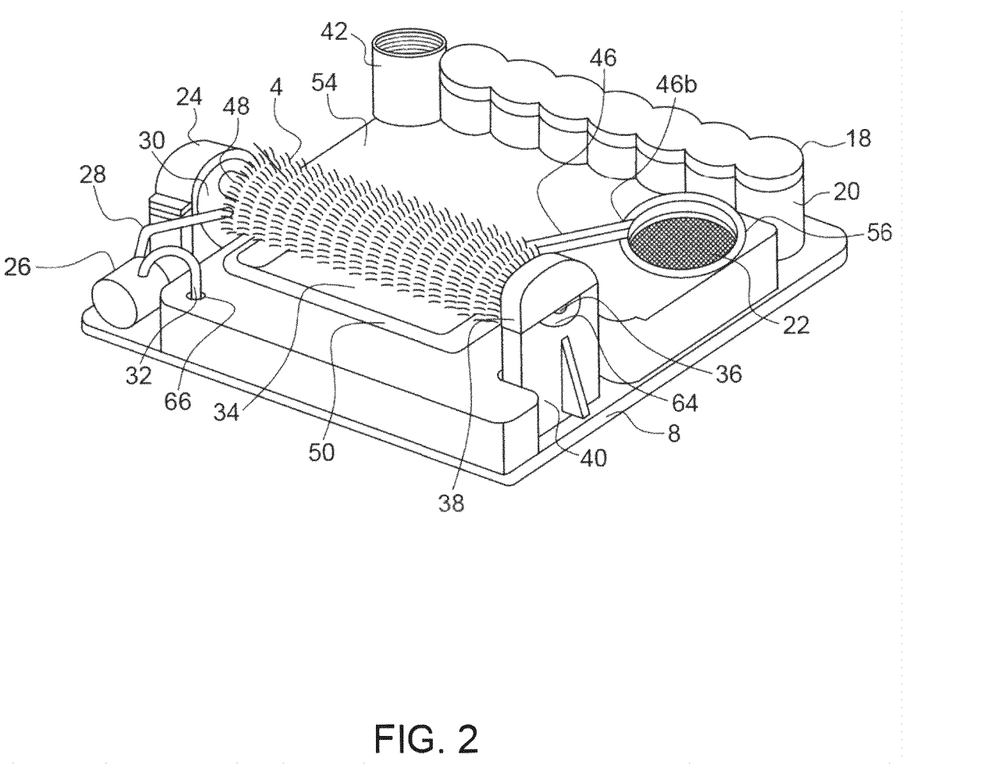
FIG. 2 illustrates a perspective view of the shoe sole cleaning device with its top housing removed.

The housing cover 2 may be removed as needed to refill cleaning solution to a fluid reservoir 54 as shown in FIG. 2. A slot or window 6 on the side of the housing cover 2 may be used to show how much cleaning solution is left in the fluid reservoir 54 so that the solution can be replaced as needed. The fluid reservoir 54 may be fabricated from, for example, a transparent or semitransparent material so that the amount of fluid left in the fluid reservoir 54 may be observed through the slot or window 6.

FIG. 2 illustrates the exemplary shoe sole cleaning device 1 with the housing cover 2 removed.

The device 1 may include the fluid reservoir capsule 54 which has an inner chamber for containing the cleaning solution, a fluid exit port 66, and a fluid recycle port 56. The device 1 may also include a trough 34, which may be molded into or independent from reservoir capsule 54. A rim 50 of the trough 34 may be raised to help keep the cleaning solution from exiting the trough 34 in unwanted areas.

The device 1 may also include a fluid pump 26 which is operably connected to the fluid exit port 66 of the fluid reservoir capsule 54 via hose 32. The pump 26 draws cleaning solution from the fluid exit port 66 of the fluid reservoir capsule 54 via the hose 32 and delivers the cleaning fluid to the trough 34 via a tube 28.

The device 1 may also include the brush 4, which is disposed partially within the trough 34 such that some of the bristles are at least partially submersible in the cleaning solution in the trough 34. The device 1 may also include a motor 30 for rotating the brush 4 about its longitudinal axis.

In the illustrated embodiment, the brush 4 is mounted in a horizontal position above and within the trough 34. Brush 4 is held on one side by shaft 48 and on the other side by shaft 36 supported by bearing 64 and bearing support bracket 40. Motor 30 is captured by retaining bracket 24. The close proximity of the bristles of the brush 4 and the semi-cylindrical contour of the trough 34 causes the cleaning solution to coat a substantial portion of the brush 4, thereby delivering an adequate amount of the cleaning solution to the sole of the user's shoe as the brush 4 brushes the sole clean.

The device 1 may also include a fluid recycle conduit 46, which has an inflow end 46a adjacent to or below the rim 50 of the trough 34 and an outflow end 46b adjacent the fluid recycle port 56 of the fluid reservoir capsule 54. The fluid recycle conduit 46 transports the cleaning solution from the trough 34 to the fluid recycle port 56 when the cleaning solution in the trough 34 reaches a predetermined height.

In the illustrated embodiment, the device 1 also includes a filter 22 to filter solids from the cleaning solution transported from the trough 34 to the fluid reservoir capsule 54. The filter 22 catches dirt and other particles and prevents them from entering the fluid reservoir capsule 54. The filter 22 may be shaped to fit within the fluid recycle port 56. The filter 22 may be removable to be cleaned or replaced as needed. The filter 22 may also be removed to refill the fluid reservoir capsule 54 with cleaning solution through the fluid recycle port 56.

The device 1 may also include a battery compartment 20, which may include a cap 18 that can be removed to replace the batteries. The battery compartment 20 holds batteries that provide power to the fluid pump 26 and the motor 30 upon actuation of one or more of the switches 12, 14.

Alternately, the user can plug in an AC to DC transformer to power the present invention by standard 120 VAC power from a wall socket.

The device 1 may also include a threaded post receiver 42 to which the user may attach the support post 16 if desired.

The fluid reservoir capsule 54 and brush/motor assembly as well as the battery compartment 20 are mounted on base plate 8. Thus, the housing cover 2 and the base plate 8 form a housing that houses the fluid reservoir 54, the trough 34, the fluid pump 26, at least a portion of the brush 4, the motor 30, the fluid recycle conduit 46, and the battery compartment 20 thereby making the shoe sole cleaning device 1 portable.

Figure 3:
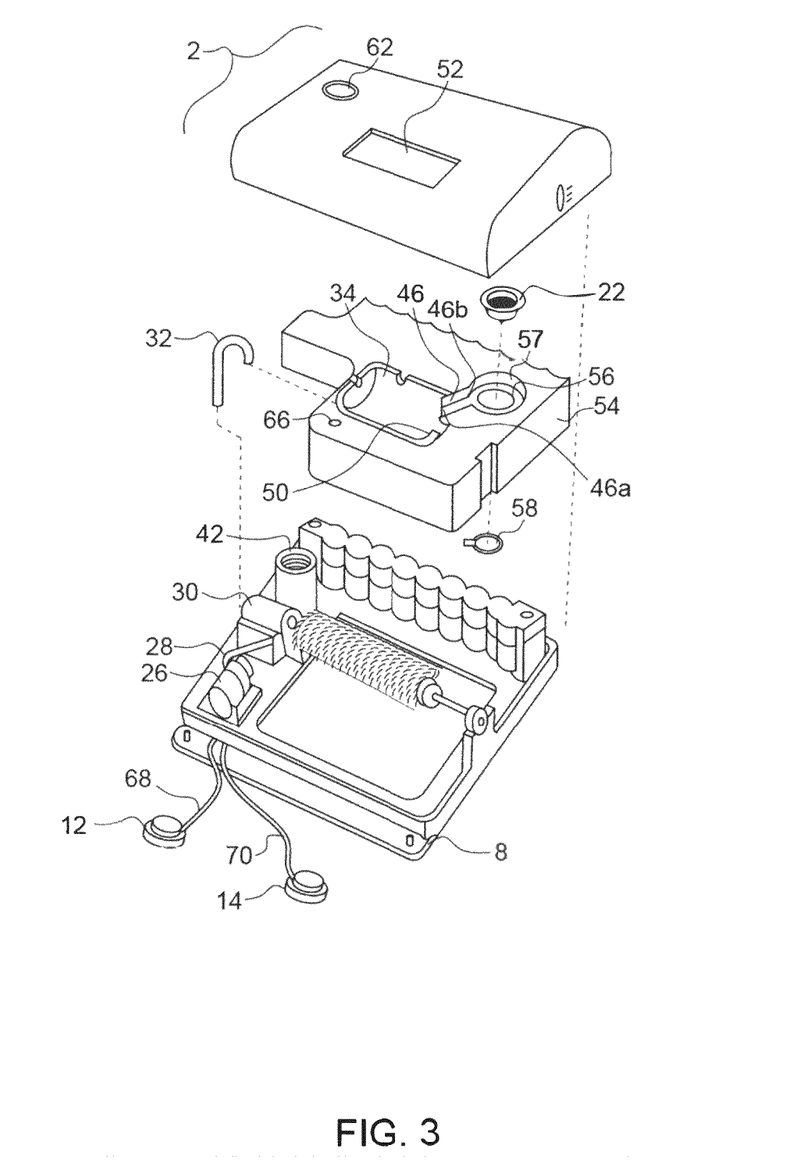
FIG. 3 illustrates an exploded view of the shoe sole cleaning device.

FIG. 3 illustrates an exploded view of the exemplary portable shoe sole cleaning device 1.

As can be seen from FIG. 3, the filter 22 is removable upon removal of the housing cover 2 so that the filter 22 may be cleaned or replaced. The housing cover 2 has an aperture 62 through which support post 16 may be inserted and secured to threaded post receiver 42. The housing cover 2 also has a main rectangular aperture 52 through which a portion of the brush 4 protrudes to allow the brush's bristles to engage the sole of the shoe being cleaned.

Electrical switches 12, 14 may be connected to the electrical circuit including the pump, 26, motor 30, and batteries by the cables 68, 70, which may be positioned within or under the absorbent mat 10 as shown in FIG. 1.

As may be appreciated from FIG. 3, fluid reservoir 54 is a capsule with a minimum number of openings (ports 66 and 56) to access its inner chamber, which reduces the amount of leakage and evaporation of the cleaning solution from the inner chamber. Fluid reservoir capsule 54 may be made of blow molded plastic and includes the fluid recycle port 56 for filling the capsule 54 with cleaning solution and the fluid exit port 66 that receives the hose 32. The fluid recycle conduit 46 has inflow end 46a adjacent to or below the rim 50 of the trough 34 and an outflow end 46b adjacent the fluid recycle port 56 of the fluid reservoir capsule 54.

In the illustrated embodiment, the trough 34 and the fluid recycle conduit 46 are formed on an upper wall of the fluid reservoir capsule 54 and thus are integral with the fluid reservoir capsule 54. The fluid recycle conduit 46 declines from the inflow end 46a to the outflow end 46b so as to transport (gravity-assisted) the cleaning solution from the trough 34 to the fluid recycle port 56 when the cleaning solution in the trough 34 reaches a predetermined height. The predetermined height of the cleaning solution in the trough 34 is determined by the meeting point of the trough 34 and the inflow end 46a of the fluid recycle conduit 46. In the illustrated embodiment, the inflow end 46a of the fluid recycle conduit 46 connects to the trough 34 at a break in the rim 50 of the trough 34. The outflow end 46b of the fluid recycle conduit 46 connects to the fluid recycle port 56 of the fluid reservoir capsule 54 at a break in a rim 57 of the fluid recycle port 56. In other embodiments, the conduit 46 is pump-assisted instead of or in addition to gravity-assisted.

The device 1 may also include a one way valve 58 operably connected to the fluid reservoir 54 at the fluid recycle port 56. The one way valve 58 allows cleaning solution to enter the inner chamber of the fluid reservoir capsule 54 via the fluid recycle port 56 but prevents cleaning solution from exiting the inner chamber of the fluid reservoir capsule 54 through the fluid recycle port 56. The one way valve 58 prevents both leakage and, perhaps more important, evaporation of the cleaning solution from the inner chamber of the fluid reservoir capsule 54 through the fluid recycle port 56.

In other embodiments, the one way valve 58 may be disposed adjacent or within the fluid reservoir capsule 54 or the fluid recycle conduit 46. The one way valve 58 may take the form of a flapper as shown in FIG. 3 or the form of other known one way valves.

Regarding the other opening of the in the reservoir capsule 54, the fluid exit port 66, the hose 32 and the fluid pump 26 effectively minimize leakage and evaporation of the cleaning solution from the inner chamber of the fluid reservoir capsule 54 through the fluid exit port 66.

The invention disclosed herein addresses the problems of wet soles after cleaning or needing an additional drying step (by mat or air dryer) by providing a device that deals well with a cleaning solution including a drying agent (e.g., surfactant, alcohol, citric acid, etc.) to assist in rapid drying of the soles after cleaning. Adding the drying agent should obviate the need to have a drying mat or an air dryer.

The invention disclosed herein greatly reduces the frequency of refilling the cleaning solution reservoir and allows for a drying agent to be used in the cleaning solution by providing for a) recycling of the cleaning solution, b) a capsule reservoir 54 that has a minimum number of openings (ports 66 and 56) to access its inner chamber reducing the amount of leakage and evaporation of the cleaning solution from the inner chamber, and c) effective seals for those openings further reducing the amount of leakage and evaporation of the cleaning solution from the inner chamber.

Figure 4:
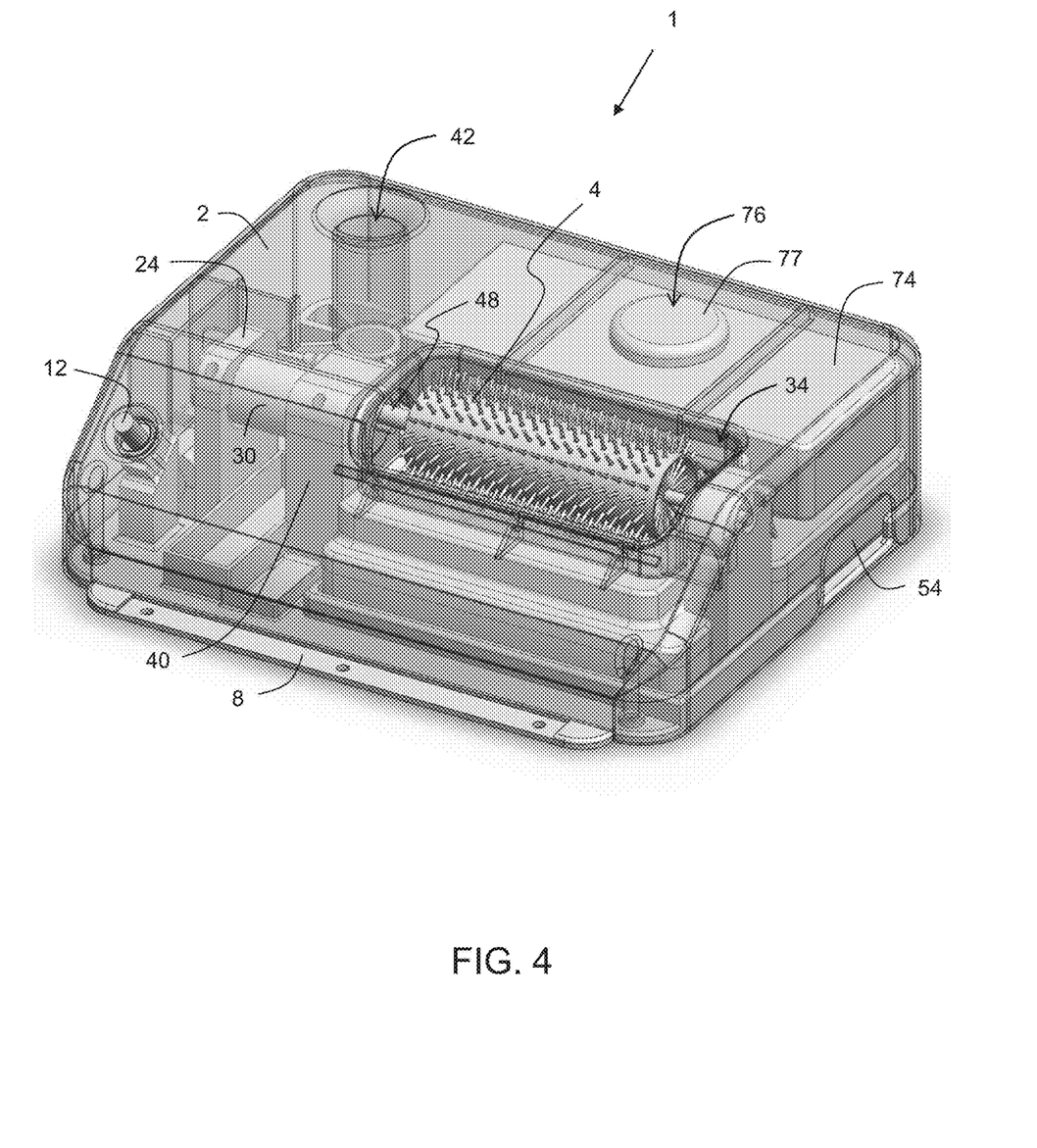
FIG. 4 illustrates a perspective view of an exemplary shoe sole cleaning device.
Figure 5A:
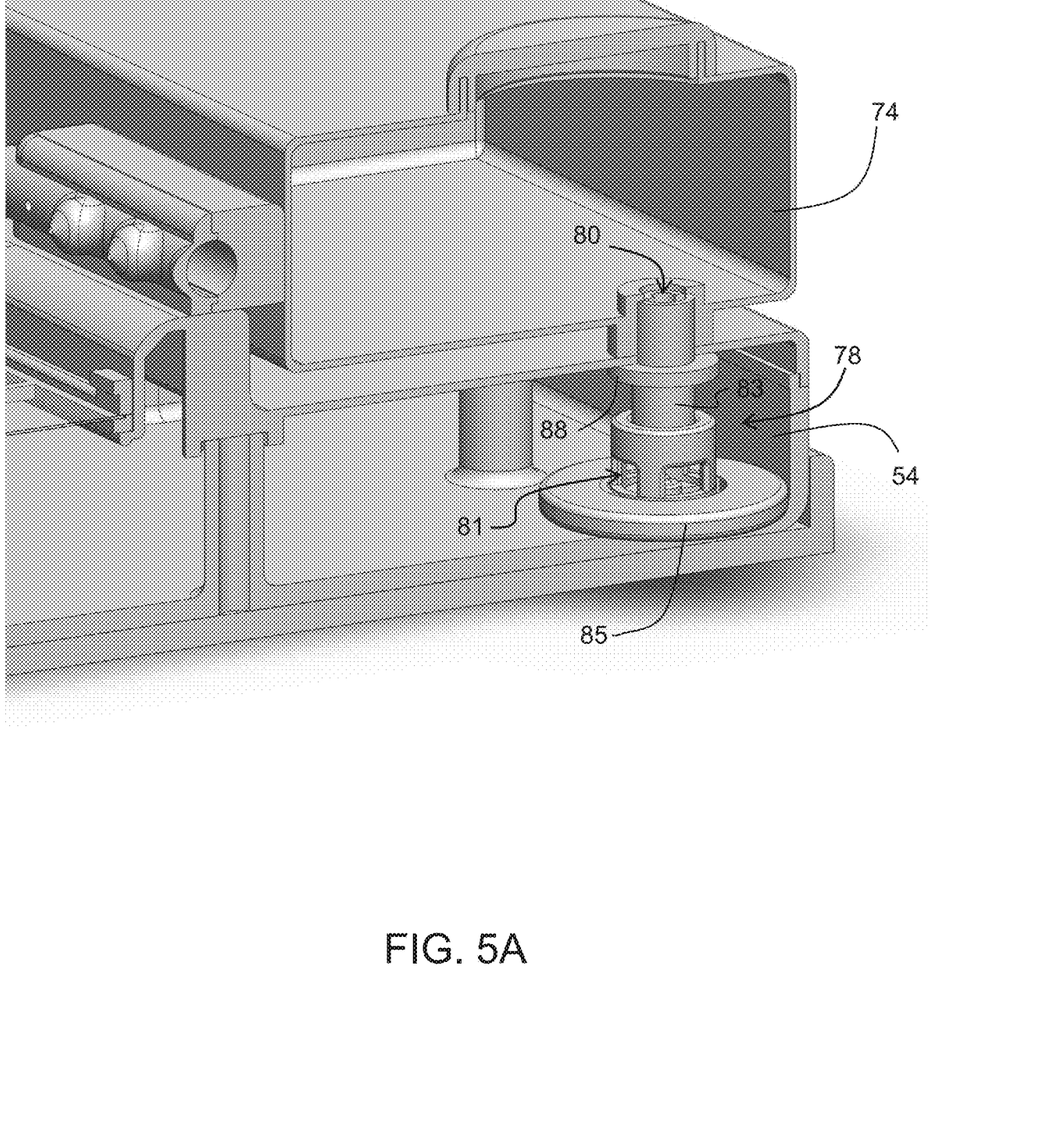
FIGS. 5A and 5B illustrate cross-sectional views of the shoe sole cleaning device.
Figure 5B:
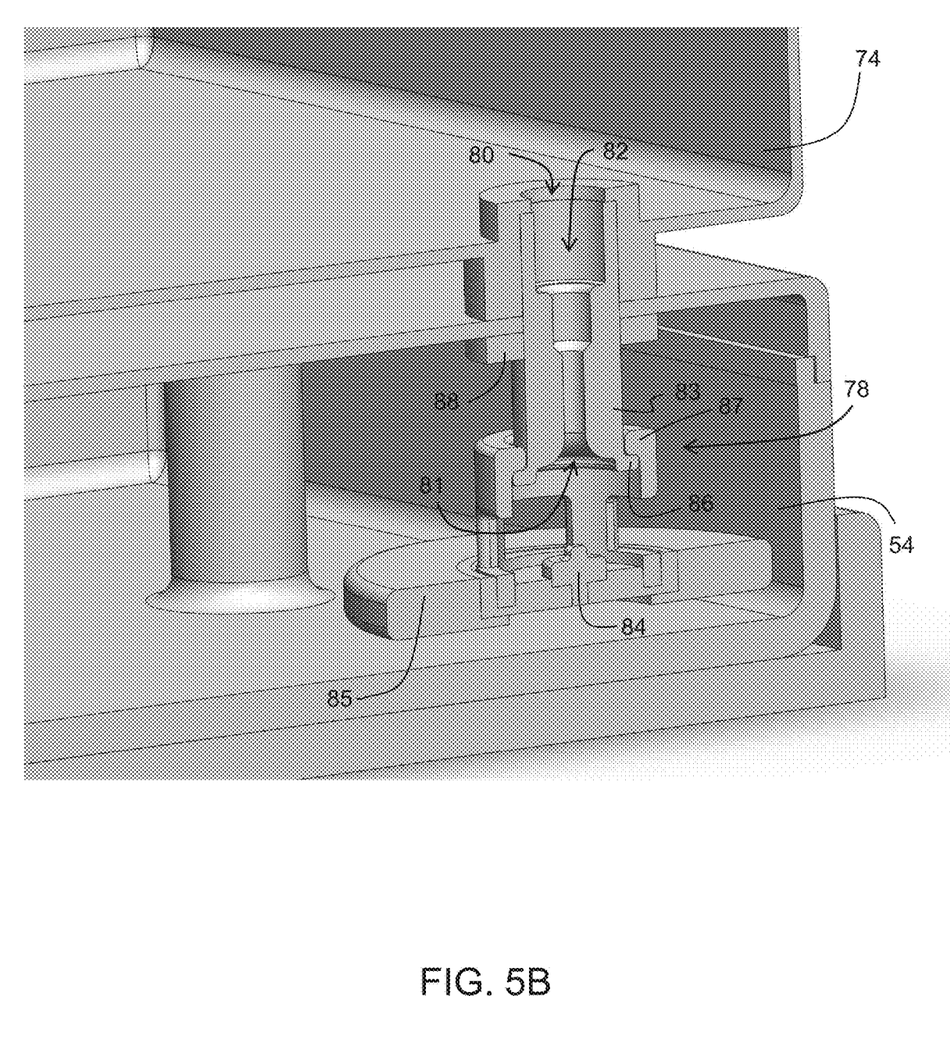
Figure 6:
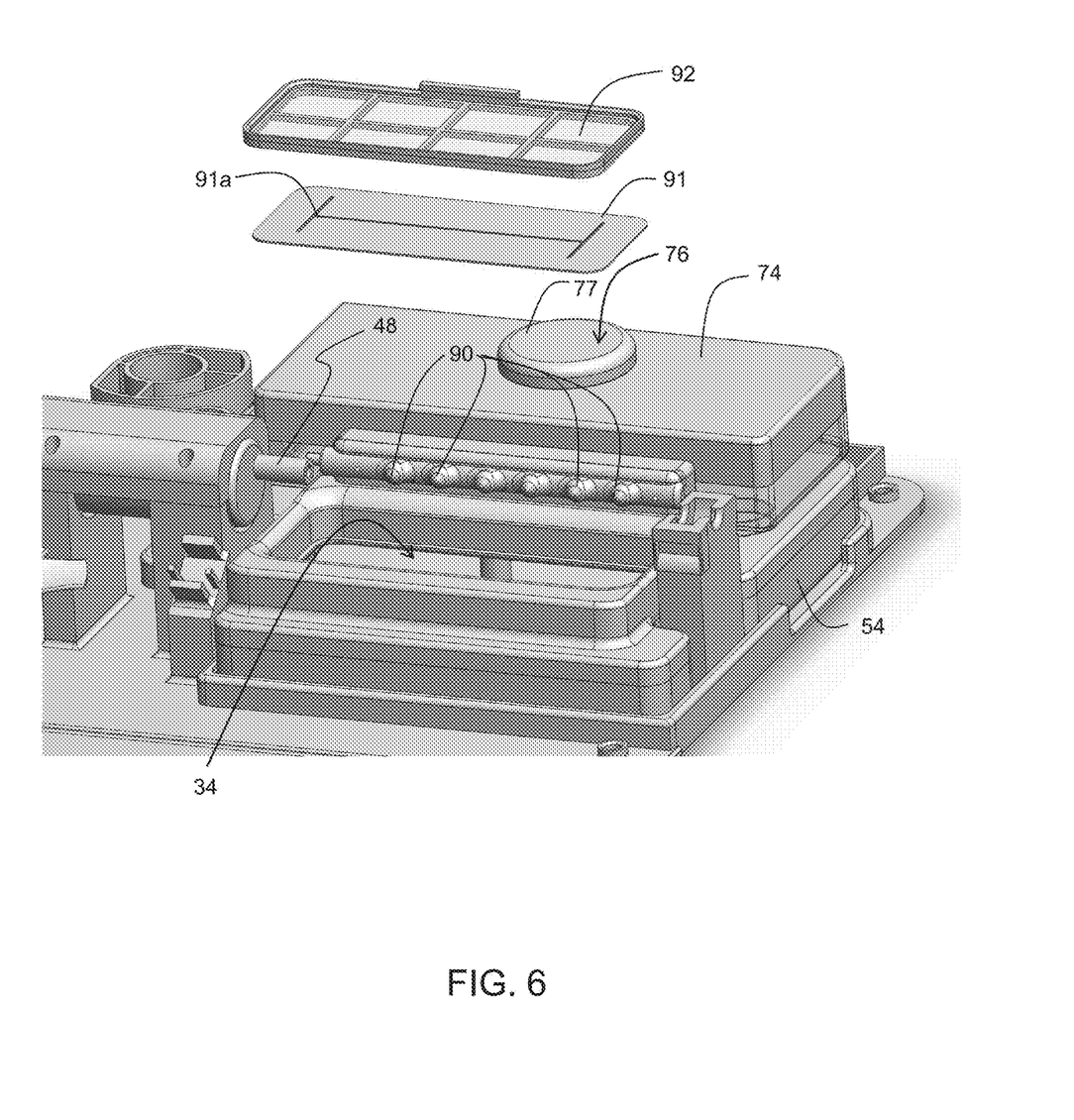
FIG. 6 illustrates a magnified view of the shoe sole cleaning device.

FIGS. 4-6 illustrate another embodiment of the exemplary shoe sole cleaning device 1. FIG. 4 illustrates the exemplary shoe sole cleaning device 1 with the housing cover 2 made transparent for illustration purposes. In the illustrated embodiment, a housing cover 2 and a base plate 8 of the device 1 enclose a mechanism that causes a cylindrically shaped cleaning brush 4 to rotate when a user presses on a switch 12. The shoe sole cleaning device 1 may also include a support post (not shown) affixed to a post receiver 42. A user may hold on to the post with one hand while using the device 1 to clean the sole of a shoe.

In the embodiment of FIGS. 4-6, the device 1 includes an upper fluid reservoir 74 and a lower fluid reservoir 54, each of which has an inner chamber. The lower fluid reservoir 54 is disposed lower than the upper fluid reservoir 74. The housing cover 2 may be removed as needed to refill cleaning solution to the upper fluid reservoir 74. The upper fluid reservoir 74 may have a port or opening 76 formed on an upper wall to refill the reservoir 74. The device 1 may include a cap 77 to close the opening 76 to minimize evaporation of cleaning solution from the upper fluid reservoir 74. A slot or window (not shown) on the side of the housing cover 2 may be used to show how much cleaning solution is left in the fluid reservoirs 54 and/or 74 so that the solution can be replaced as needed. The fluid reservoir 54 and 74 may be fabricated from, for example, a transparent or semitransparent material so that the amount of fluid left in the fluid reservoirs 54 and/or 74 may be observed through the slot or window.

The device 1 may include a trough 34, which may be molded into or independent from the lower reservoir 54. In the illustrated embodiment, the trough 34 is formed on an upper wall of the lower fluid reservoir 54. The trough 34 is fluidly coupled to the lower fluid reservoir 54. The device 1 may also include the brush 4, which may be disposed partially within the trough 34 or above the trough 34. The brush 4 has bristles and is operably connected to an axial shaft or shafts. In the illustrated embodiment, the brush 4 is mounted in a horizontal position partially above and partially within the trough 34. Brush 4 is held by a shaft 48 supported by bearing support bracket 40. The device 1 may also include a motor 30 for rotating the brush 4 about its longitudinal axis. Motor 30 is captured by retaining bracket 24.

FIGS. 5A and 5B illustrate cross sectional views of the exemplary device 1 and particularly the upper fluid reservoir 74 and the lower fluid reservoir 54. The device 1 may include a float valve 78 that allows fluid to flow from the upper fluid reservoir 74 to the lower fluid reservoir 54 but only when fluid in the lower fluid reservoir 54 is low. The valve 78 includes an inlet 80 fluidly coupled to the upper fluid reservoir 74 and an outlet 81 fluidly coupled to the lower fluid reservoir 54. The inlet 80 and the outlet 81 are fluidly connected by a flow passage 82 inside a main shaft 83 of the valve 78. The float valve 78 includes a seal 84 which has a shape matching the outlet 81. The float valve 78 also includes a float 85 disposed inside the lower fluid reservoir 54. The seal 84 is operably coupled to the float 85 such that the seal 84 closes the outlet 81 when liquid in the lower fluid reservoir 54 increases lifting the float 85. The seal 84 moves away from the outlet 81 effectively opening the valve 78 when liquid in the lower fluid reservoir 54 decreases lowering the float 85. The outlet 81 includes an outwardly extending flange 86. The float 85 includes an inwardly extending flange 87 that surrounds the main shaft 83 of the float valve 78, seals against a shoulder 88 of the valve 78 when the float valve 78 is in the closed position, and captures the outwardly extending flange 86 when the float valve 78 is in the open position.

FIG. 6 illustrates the device 1 with the brush 4 removed for illustration purposes. The device 1 may include nozzles 90 disposed along an axis parallel to the axial shaft of the brush 4 and aiming at the brush 4. In one embodiment, the device 1 includes only one nozzle 90. In other embodiments, the device 1 include more than one nozzle 90. The device 1 may also include a pump (not shown) fluidly coupled to at least one of the upper fluid reservoir 74 and the lower fluid reservoir 54 and to the nozzles 90. The pump draws cleaning solution from the at least one of the upper fluid reservoir 74 and the lower fluid reservoir 54 and delivers the cleaning fluid to the nozzles 90 to be sprayed onto the brush 4.

The switch 12 is operably connected to the motor 30 and the pump and configured to cause the motor 30 to rotate the brush 4 about the axial shaft and to cause the pump to pump cleaning solution from the at least one of the upper fluid reservoir 74 and the lower fluid reservoir 54 to the nozzles 90 to spray cleaning solution on the brush 4. The switch 12 may be a discrete switch or a switch associated with another device such as, for example, a motion sensor, etc.

The device 1 may also include a membrane or sheath 91 shaped to fit within the trough 34. The sheath 91 may have formed thereon limited passages (e.g., pores, holes, grooves, etc.) 91a that generally allow cleaning solution to flow down from the brush 4 through the trough 34 to the lower fluid reservoir 54. The sheath 91, even with the passages 91a, however, greatly reduces exposure of cleaning solution in the fluid reservoir 54 through the trough 34 and, thus, greatly limits evaporation of the cleaning solution in the fluid reservoir 54. The sheath 91 may be removable to be cleaned or replaced as needed.

The device 1 may also include a replaceable filter 92 shaped to fit within the trough 34 to filter solids from cleaning solution transported from the brush 4 to the trough 34 to the lower fluid reservoir 54. The filter 92 catches dirt and other particles and prevents them from entering the fluid reservoir 54. The filter 92 also reduces an amount of evaporation of the cleaning solution in the fluid reservoir 54. The filter 92 may be removable to be cleaned or replaced as needed.

Upon actuation of the switch 12, the motor 30 rotates the brush 4 and the pump causes the nozzles 90 to spray the cleaning solution. Extra solution dripping from the brush 4 may flow through the filter 92 into the lower fluid reservoir 54. As time goes by, the amount of solution in the lower fluid reservoir 54 will decrease causing the valve 78 to open causing cleaning solution from the upper fluid reservoir 74 to flow into the lower fluid reservoir 54. This arrangement with the two reservoirs 54, 74, the valve 78, the filter 92 and sheath 91, significantly reduces evaporation of the cleaning fluid and, thus, reduces how often cleaning fluid needs replaced.

The invention disclosed herein addresses the problems of wet soles after cleaning or needing an additional drying step (by mat or air dryer) by providing a device that deals well with a cleaning solution including a drying agent (e.g., surfactant, alcohol, citric acid, etc.) to assist in rapid drying of the soles after cleaning. Adding the drying agent may obviate the need to have a drying mat or an air dryer. In one embodiment, however, the device 1 includes an air dryer, fans, etc. to assist in drying soles after cleaning.

The invention disclosed herein greatly reduces the frequency of refilling the cleaning solution reservoir and allows for a drying agent to be used in the cleaning solution by providing for a) recycling of the cleaning solution, b) reservoirs 54 and 74 that have a minimum number of openings to access their inner chambers reducing the amount of leakage and evaporation of the cleaning solution from the inner chambers, and c) effective seals for those openings further reducing the amount of leakage and evaporation of the cleaning solution from the inner chamber.

While example systems, methods, and so on, have been illustrated by describing examples, and while the examples have been described in considerable detail, it is not the intention to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, and illustrative examples shown or described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components. An "operable connection," or a connection by which entities are "operably connected," is one by which the operably connected entities or the operable connection perform its intended purpose. For example, two entities may be operably connected to each other directly or through one or more intermediate entities.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (3D. Ed. 1995).

What is claimed is:

1. A shoe sole cleaning device comprising:
    an upper fluid reservoir having an inner chamber;
    a lower fluid reservoir disposed lower than the upper fluid reservoir and having an inner chamber;
    a float valve having an inlet fluidly coupled to the upper fluid reservoir and an outlet fluidly coupled to the lower fluid reservoir, the float valve including a seal having a shape matching the outlet and a float disposed inside the lower fluid reservoir, the seal operably coupled to the float such that the seal closes the outlet when liquid in the lower fluid reservoir increases lifting the float and opens the outlet when liquid in the lower fluid reservoir decreases lowering the float;
    a trough fluidly coupled to the lower fluid reservoir;
    a brush having bristles and operably connected to an axial shaft, the brush disposed partially within or above the trough;
    a motor operably connected to the axial shaft and configured to cause the brush to rotate about the axial shaft;
    at least one nozzle disposed aiming at the brush;
    a pump fluidly coupled to at least one of the upper fluid reservoir and the lower fluid reservoir and to the at least one nozzle; and
    a switch operably connected to the motor and the pump and configured to cause the motor to rotate the brush about the axial shaft and to cause the pump to pump cleaning solution from the at least one of the upper fluid reservoir and the lower fluid reservoir to the nozzle to spray cleaning solution on the brush.

2. The shoe sole cleaning device of claim 1, wherein the trough is formed on an upperwall of the lower fluid reservoir.

3. The shoe sole cleaning device of claim 1, wherein the upper fluid reservoir has an opening formed on an upper wall of the upper fluid reservoir, the opening closeable to minimize evaporation of cleaning solution from the upper fluid reservoir.

4. The shoe sole cleaning device of claim 1, comprising:
    a replaceable filter shaped to fit within the trough to filter solids from cleaning solution transported from the brush to the trough to the lower fluid reservoir.

5. The shoe sole cleaning device of claim 1, comprising:
    a replaceable sheath shaped to fit within the trough and having formed thereon passages that allow cleaning solution to flow into the lower fluid reservoir but limits evaporation of cleaning solution from the lower fluid reservoir.

6. The shoe sole cleaning device of claim 1, the float valve comprising: a flow passage fluidly connecting the inlet to the outlet;
    the outlet including an outwardly extending flange and the float including an inwardly extending flange that surrounds a main shaft of the float valve and captures the outwardly extending flange in an open position of the float valve.

7. The shoe sole cleaning device of claim 1, wherein the at least one nozzle includes multiple nozzles disposed along an axis parallel to the axial shaft.

8. A shoe sole cleaning device comprising:

an upper fluid reservoir having an inner chamber;

a lower fluid reservoir having an inner chamber;

a float valve having an inlet fluidly coupled to the upper fluid reservoir and an outlet fluidly coupled to the lower fluid reservoir, the float valve including a seal having a shape matching the outlet and a float disposed inside the lower fluid reservoir, the seal operably coupled to the float such that the seal closes the outlet when liquid in the lower fluid reservoir increases lifting the float and opens the outlet when liquid in the lower fluid reservoir decreases lowering the float;

a trough fluidly coupled to the lower fluid reservoir;

a brush having bristles and operably connected to an axial shaft, the brush disposed partially within or above the trough; and a motor operably connected to the axial shaft and configured to cause the brush to rotate about the axial shaft.

9. The shoe sole cleaning device of claim 8, wherein the trough is formed on an upperwall of the lower fluid reservoir.

10. The shoe sole cleaning device of claim 8, wherein the upper fluid reservoir has an opening formed on an upper wall of the upper fluid reservoir, the opening closeable to minimize evaporation of cleaning solution from the upper fluid reservoir.

11. The shoe sole cleaning device of claim 8, comprising:

a replaceable filter shaped to fit within the trough to filter solids from cleaning solution transported from the brush to the trough to the lower fluid reservoir.

12. The shoe sole cleaning device of claim 8, comprising:

a replaceable sheath shaped to fit within the trough and having formed thereon passages that allow cleaning solution to flow into the lower fluid reservoir but limits evaporation of cleaning solution from the lower fluid reservoir.

13. The shoe sole cleaning device of claim 8, the float valve comprising: a flow passage fluidly connecting the inlet to the outlet;

the outlet including an outwardly extending flange and the float including an inwardly extending flange that surrounds a main shaft of the float valve and captures the outwardly extending flange in an open position of the float valve.

14. A shoe sole cleaning device comprising:

a fluid reservoir having an inner chamber;

a trough fluidly coupled to the fluid reservoir;

a brush having bristles and operably connected to an axial shaft;

a motor operably connected to the axial shaft and configured to cause the brush to rotate about the axial shaft;

at least one nozzle disposed aiming at the brush;

a pump fluidly coupled to the fluid reservoir and to the at least one nozzle;

a switch operably connected to the motor and the pump and configured to cause the motor to rotate the brush about the axial shaft and to cause the pump to pump cleaning solution from the fluid reservoir to the nozzle to spray cleaning solution on the brush; and a replaceable sheath shaped to fit within the trough and having formed thereon passages that allow cleaning solution to flow into the fluid reservoir but limits evaporation of cleaning solution from the fluid reservoir.

15. The shoe sole cleaning device of claim 14 wherein the trough is formed on an upper wall of the fluid reservoir.

16. The shoe sole cleaning device of claim 14, wherein the fluid reservoir has an opening formed on an upper wall of the fluid reservoir, the opening closeable to minimize evaporation of cleaning solution from the fluid reservoir.

17. The shoe sole cleaning device of claim 14, comprising:

a replaceable filter shaped to fit within the trough to filter solids from cleaning solution transported from the brush to the trough to the fluid reservoir.

18. The shoe sole cleaning device of claim 14, wherein the at least one nozzle includes multiple nozzles disposed along an axis parallel to the axial shaft.

* * * * *